(12) United States Patent
Brown

(10) Patent No.: US 6,941,802 B2
(45) Date of Patent: Sep. 13, 2005

(54) VEHICLE SPARE TIRE PRESSURE DETECTION ASSEMBLY

(75) Inventor: Mathew Brown, South Lyon, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 50 days.

(21) Appl. No.: 10/764,472

(22) Filed: Jan. 27, 2004

(65) Prior Publication Data

US 2005/0160804 A1 Jul. 28, 2005

(51) Int. Cl.$^7$ .............................................. B66D 1/00
(52) U.S. Cl. ......................... 73/146; 254/323; 414/463
(58) Field of Search .......................... 73/146; 248/329; 254/323; 414/463

(56) References Cited

U.S. PATENT DOCUMENTS

| | | | |
|---|---|---|---|
| 5,993,133 A | 11/1999 | Murray et al. | |
| 6,561,489 B1 | 5/2003 | Wakefield | |
| 6,655,896 B2 * | 12/2003 | Morin et al. | 414/463 |
| 6,682,293 B2 * | 1/2004 | Dziedzic et al. | 414/463 |
| 2003/0021662 A1 | 1/2003 | Ramsey | |

OTHER PUBLICATIONS

Electronic Tire Carrier brochure; Dura Control Systems; prior to Jan. 27, 2004; 1 page.

* cited by examiner

Primary Examiner—William Oen
Assistant Examiner—Andre Allen
(74) Attorney, Agent, or Firm—Shinjyu Global IP Counselors, LLP

(57) ABSTRACT

A vehicle spare tire pressure detection assembly includes a tire support and hoisting unit that performs the function of hoisting and storing a spare tire, and a spare tire pressure detection unit that performs the function of monitoring tire pressure in the spare tire when the spare tire is in a stored state. The tire support and hoisting unit is configured to maintain an initial compression force on a side wall of the spare tire to deflect the side wall of the spare tire. The spare tire pressure detection unit monitors the adjustments made by the tire support and hoisting unit to maintain the initial compression force on the spare tire to determine if the spare tire has lost tire pressure below a predetermined threshold amount. A human detectable signal is produced when the spare tire pressure falls below the predetermined threshold amount.

17 Claims, 6 Drawing Sheets

VEHICLE SPARE TIRE PRESSURE DETECTION ASSEMBLY

BACKGROUND OF THE INVENTION

1. Field of the Invention

The present invention generally relates to a vehicle spare tire pressure detection assembly. More specifically, the present invention relates to a vehicle spare tire pressure detection assembly that monitors tire pressure in a spare tire mounted to a vehicle to determine if the spare tire has lost tire pressure below a predetermined threshold amount.

2. Background Information

Most vehicles have a spare tire as standard equipment. The spare tire is mounted in a variety of locations depending on the construction of the vehicle. Many pickup trucks, sport utility vehicles and vans have the spare tire mounted to the undercarriage of the vehicle. In the past, the spare tire was mounted to the undercarriage via a support bracket that held the tire against a cross member of the vehicle chassis. These support brackets usually required a person to hold the spare tire with one hand while securing the support bracket about the spare tire with the other hand. These support brackets can make it difficult for a person to install the spare tire beneath the vehicle, especially with a large tire.

More recently, hoisting mechanisms have been developed for raising and lowering the spare tire relative to the chassis of the vehicle. Initially, the hoisting mechanisms were manually operated systems that utilize the spare tire jack handle to operate the hoisting mechanism to raise and lower the spare tire. Even more recently, electric hoisting mechanisms have been developed for automatically raising and lowering the spare tire. One example of an automatic winch for supporting a spare tire to the undercarriage of a vehicle is disclosed in U.S. Pat. No. 6,561,489.

Another example of an automatic winch for supporting a spare tire to the undercarriage has been developed by Dura Automotive Systems, Inc. In the automatic winch developed by Dura Automotive Systems, Inc, an electric motor is used with a vehicle chassis to raise and lower the spare tire. This electric motor is configured to operate a spool that raises the spare tire up against the vehicle until a predetermined level of torque is achieved. If the tension in the cable of the winch decreases over some period of time, the winch detects this decrease in cable tension and re-tensions the cable. Thus, the winch developed by Dura Automotive Systems, Inc is designed to securely maintain the spare tire against the vehicle.

In view of the above, it will be apparent to those skilled in the art from this disclosure that there exists a need for an improved vehicle spare tire pressure detection assembly. This invention addresses this need in the art as well as other needs, which will become apparent to those skilled in the art from this disclosure.

SUMMARY OF THE INVENTION

It has been discovered that over an extended period of time, a spare tire mounted to the vehicle often loses tire pressure. When the tire pressure in the spare tire falls below a predetermined amount, the spare tire should be repressurized. Thus, the driver of the vehicle will typically not know whether or not the spare tire has sufficient tire pressure.

Accordingly, one object of the present invention is to detect spare tire pressure in a spare tire without having to use a tire pressure gauge.

This object can basically be attained by providing a vehicle spare tire pressure detection assembly that comprises a stationary tire support structure, a tire hoisting device, a tire pressure detection unit and a signaling device. The stationary tire support structure is configured and arranged to be coupled to a vehicle. The tire hoisting device is configured and arranged to lower a spare tire relative to the stationary tire support structure and raise the spare tire against the stationary tire support structure to apply an initial compression force to deflect a wall of the spare tire. The tire hoisting device includes a detecting device and an adjustment device. The detecting device is configured and arranged to detect a change in the initial compression force. The adjustment device is configured to raise the spare tire and maintain the initial compression force in response to the change in the initial compression force detected by the detecting device. The tire pressure detection unit is operatively coupled to the tire hoisting device and configured to determine a change in spare tire pressure of the spare tire based on the change in the initial compression force detected by the detecting device. The signaling device is configured to produce a human detectable signal upon a determination of a decrease in the spare tire pressure below a predetermined threshold amount.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
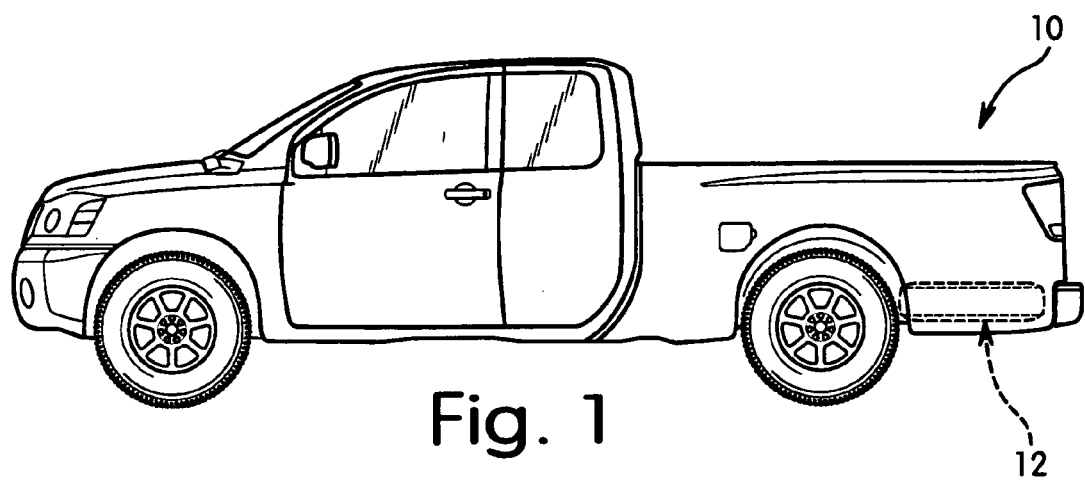
FIG. 1 is a side elevational view of a vehicle having a spare tire unit mounted to the vehicle frame via a vehicle spare tire pressure detection assembly in accordance with a preferred embodiment of the present invention.
Figure 2:
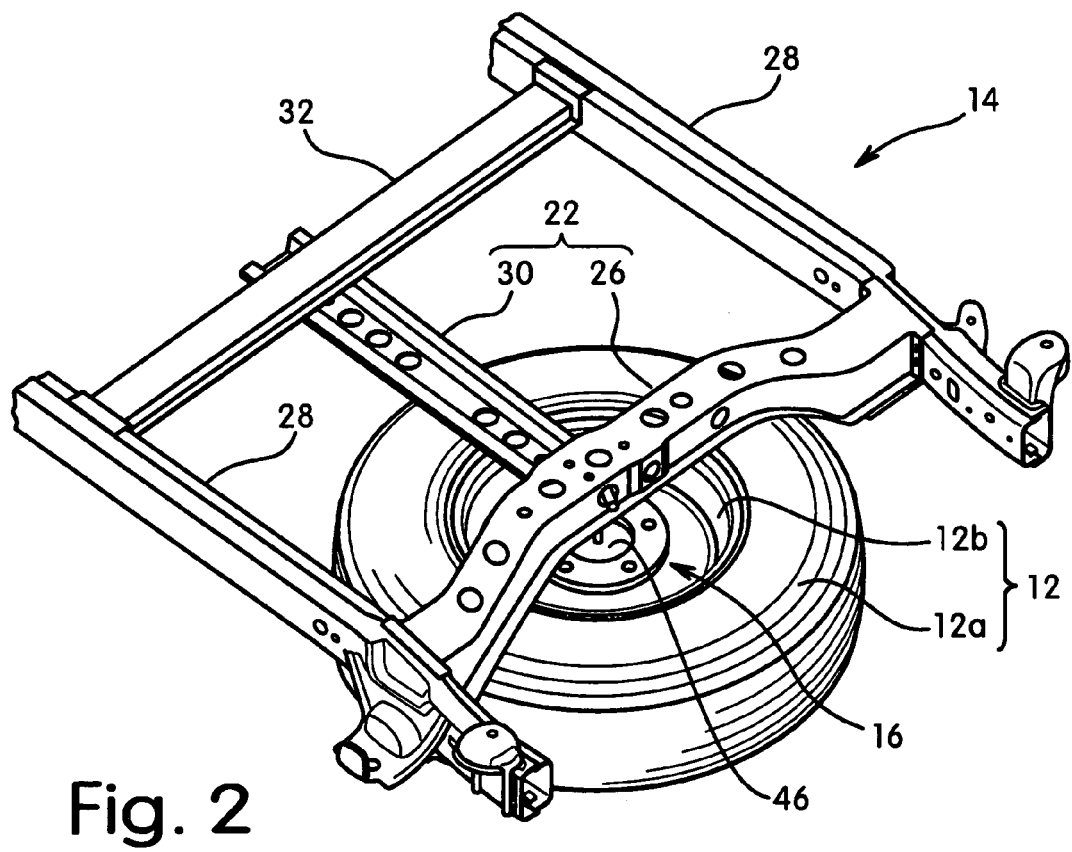
FIG. 2 is a simplified top perspective view of a portion of the vehicle frame or chassis with the spare tire unit in the stored position.
Figure 3:
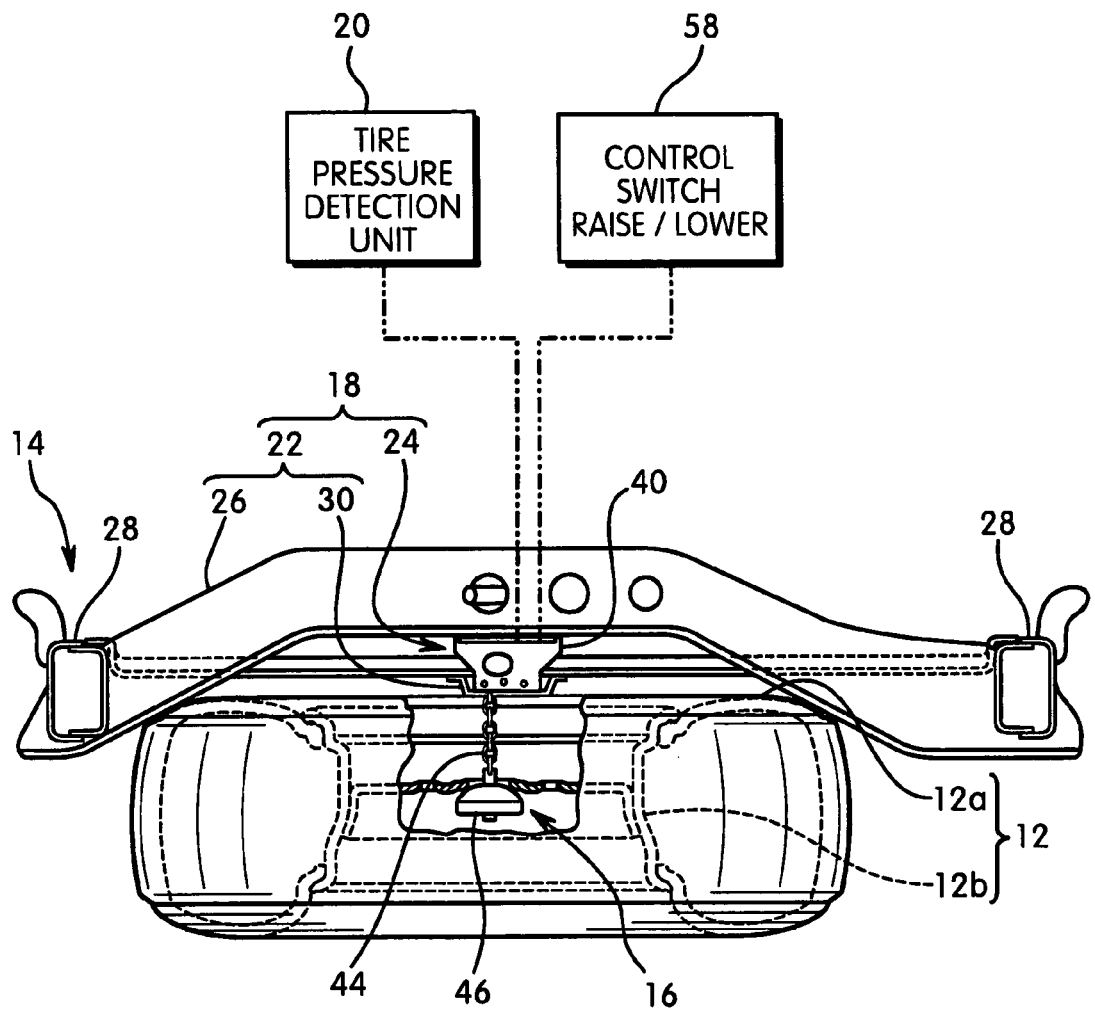
FIG. 3 is a rear end elevational view of the vehicle frame and the vehicle spare tire pressure detection assembly illustrated in FIG. 2 with a portion of the tire broken away for purposes of illustration.
Figure 4:
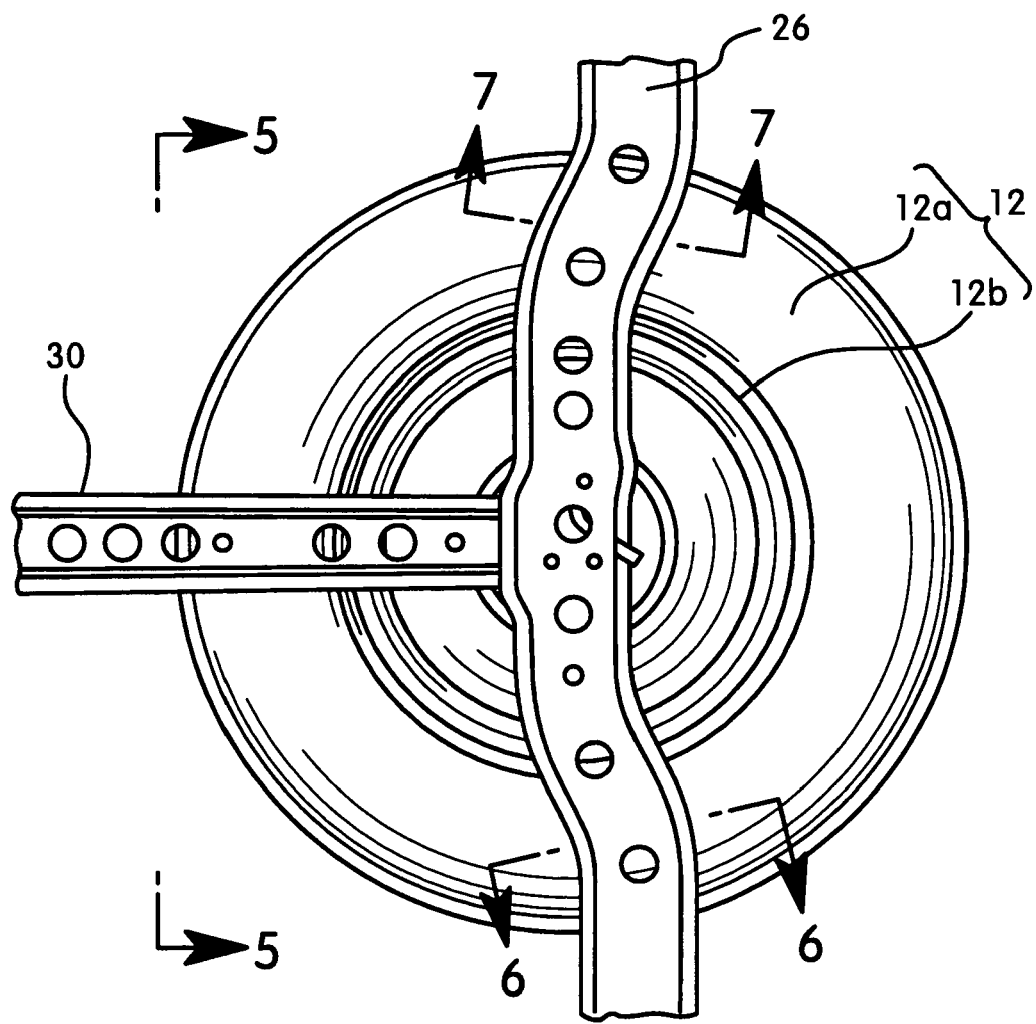
FIG. 4 is a partial top plan view of a portion of the cross member with the spare tire unit held in the stored position by the vehicle spare tire pressure detection assembly in accordance with the present invention.

Referring initially to FIGS. 1 and 2, a vehicle 10 is illustrated having a spare tire unit 12 mounted to a vehicle frame 14 via a vehicle spare tire pressure detection assembly 16. The spare tire unit 12 is a conventional wheel having a rubber tire 12a mounted on a metal rim 12b. The vehicle spare tire pressure detection assembly 16 has the dual function of hoisting and storing the spare tire unit 12 as well as monitoring tire pressure in the spare tire unit 12 to determine if the spare tire unit 12 has lost tire pressure below a predetermined threshold amount. Thus, the vehicle spare tire pressure detection assembly 16 basically includes two main components: a tire support and hoisting unit 18 and a spare tire pressure detection unit 20. The tire support and hoisting unit 18 performs the function of raising and lowering the spare tire unit 12 to and from a stored state or position, while the spare tire pressure detection unit 20 performs the function of monitoring tire pressure in the spare tire unit 12 while the spare tire unit 12 is in the stored state or position.

As explained in more detail below, the spare tire unit 12 is raised to the stored position by the tire support and hoisting unit 18 such that an initial compression force is applied to a side wall of the rubber tire 12a. This initial compression force causes a predetermined amount of deflection in the side wall of the rubber tire 12a to securely retain the spare tire unit 12 in the stored position. The tire support and hoisting unit 18 is preferably configured and arranged to automatically stop raising the spare tire unit 12 once the predetermined amount of deflection of the rubber tire 12a occurs, i.e., the initial compression force on the side wall of the rubber tire 12a has been reached. The initial compression force on the side wall of the rubber tire 12a is a predetermined value that is preferably set by the manufacturer at the factory. Once the spare tire unit 12 is held in the stored position, the tire support and hoisting unit 18 maintains this initial compression force on the side wall of the rubber tire 12a by making periodic adjustments to the compression force applied against the side wall of the rubber tire 12a as explained below.

The spare tire pressure detection unit 20 monitors the adjustments made by the tire support and hoisting unit 18 to maintain the initial compression force on the side wall of the rubber tire 12a. Based on this monitoring of the periodic adjustments by the tire support and hoisting unit 18, the spare tire pressure detection unit 20 determines if the spare tire unit 12 has lost tire pressure below the predetermined threshold amount. In particular, the current tire pressure of the spare tire unit 12 is directly correlated to the periodic adjustments by the spare tire pressure detection unit 20. If the tire pressure of the spare tire unit 12 falls below the predetermined threshold amount, a signal is produced that can be detected by an occupant of the vehicle.

Figure 5:
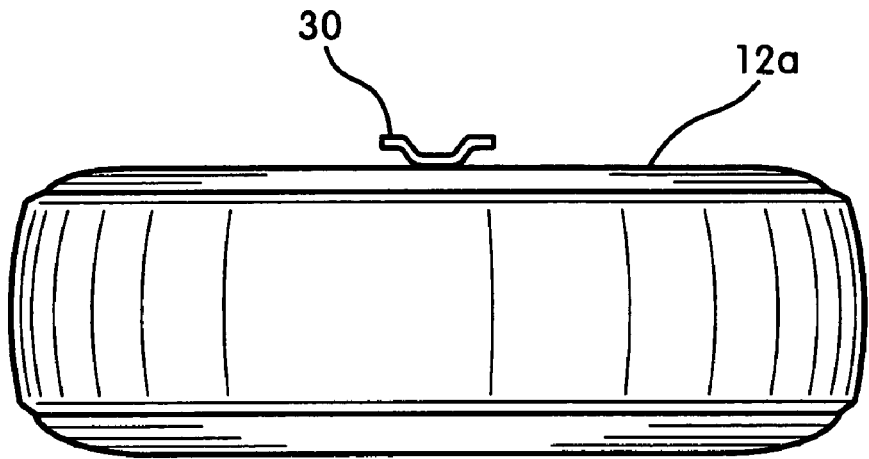
FIG. 5 is a simplified cross-sectional view of a portion of the vehicle frame as seen along section line 5—5 of FIG. 4.
Figure 6:
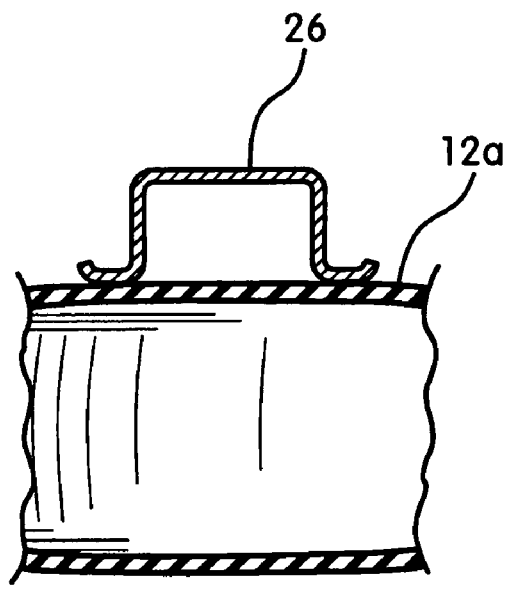
FIG. 6 is a simplified cross-sectional view of a portion of the vehicle frame as seen along section line 6—6 of FIG. 4.
Figure 7:
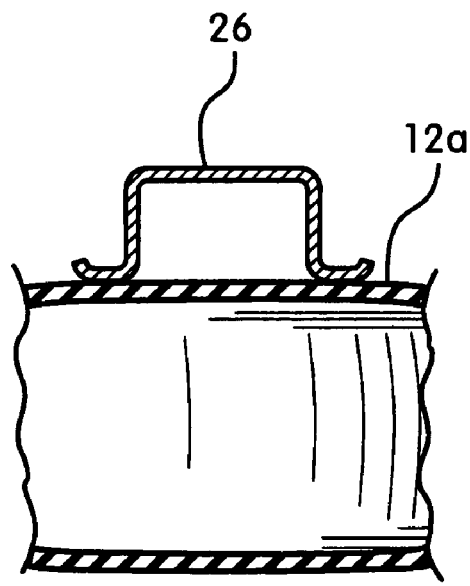
FIG. 7 is a simplified cross-sectional view of a portion of the vehicle frame as seen along section line 7—7 of FIG. 4.

The tire support and hoisting unit 18 basically includes a stationary tire support structure 22 and a tire hoisting device 24. The stationary tire support structure 22 is preferably a part of the vehicle frame that preferably includes a lateral cross member 26 that extends between a pair of longitudinal frame members 28 and a longitudinal brace member 30 that is connected to the lateral cross member 26 and a second lateral cross member 32. The lateral cross member 26 and the longitudinal brace member 30 are configured and arranged to contact the side wall of the rubber tire 12a at five points. Thus, when the tire hoisting device 24 raises the spare tire unit 12, the side wall of the rubber tire 12a contacts the cross member 26 and the longitudinal brace member 30 such that the side wall of the rubber tire 12a is compressed against the lateral cross member 26 and the longitudinal brace member 30. Preferably, as seen in FIGS. 6 and 7, the lateral cross member 26 has a hat shaped cross section such that the lateral cross member 26 contacts the side wall of the rubber tire 12a at four points. As seen in FIG. 5, the longitudinal brace member 30, on the other hand, preferably only contacts the side wall of the rubber tire 12a at one point.

The tire hoisting device 24 is preferably attached at the point where the longitudinal brace 30 is connected to the lateral cross member 26. The tire hoisting device 24 can be an electric winch such as the electric winch manufactured by Dura Automotive Systems, Inc, as mentioned above, which has an automatic cable re-tensioning feature. In any event, as diagrammatically illustrated in FIG. 8, the tire hoisting device 24 basically includes a stationary housing portion 40 that houses a motorized winding unit 42, a retractable or windable member 44 with a first end coupled to the winding unit 42, and a movable tire support member 46 coupled to the second end of the windable member 44. In the illustrated example, the windable member 44 includes a cable portion and a chain portion.

Figure 8:
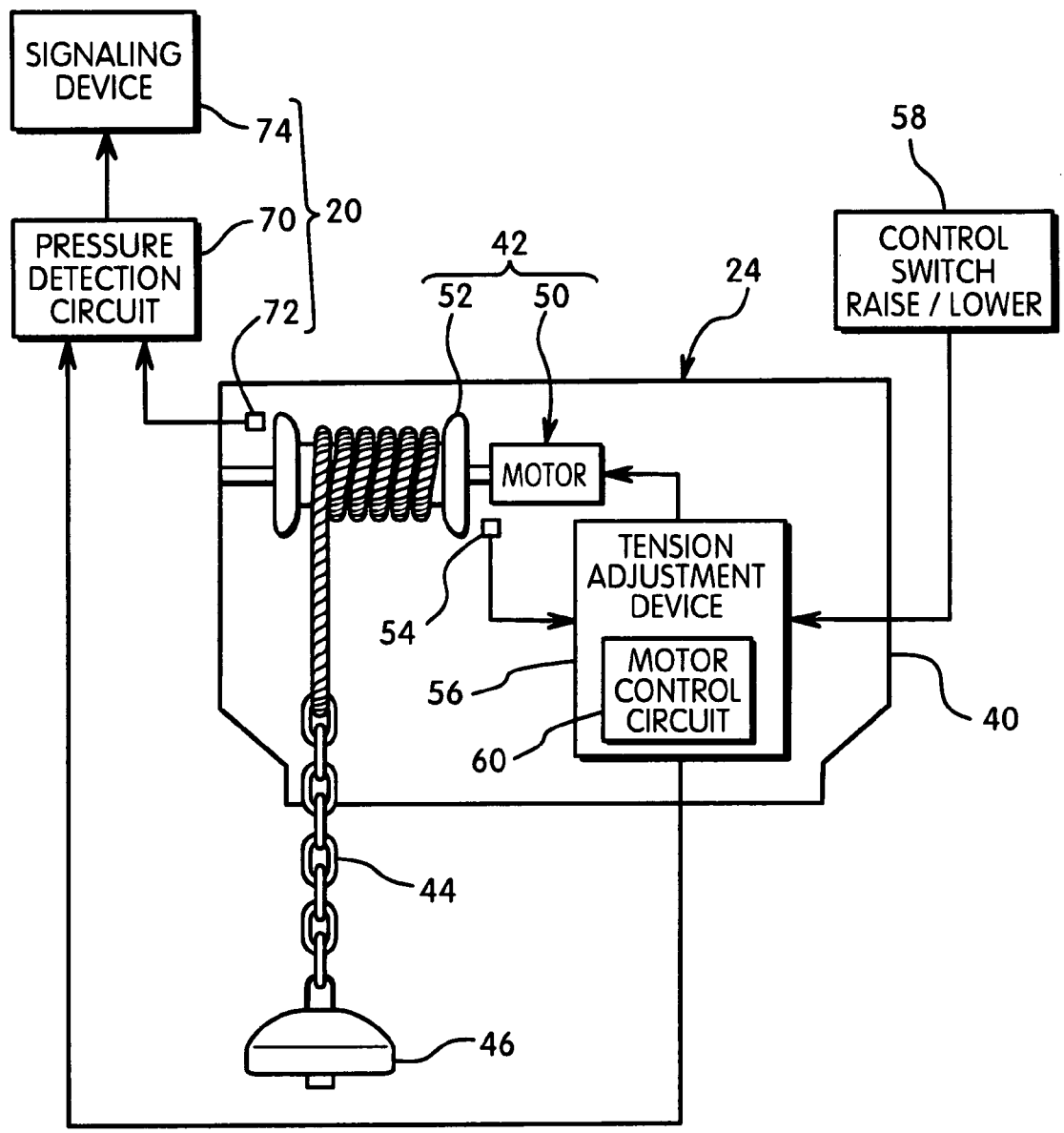
FIG. 8 is a schematic illustration of selected parts of the vehicle spare tire pressure detection assembly in accordance with the present invention.

As seen in FIG. 8, the motorized winding unit 42 is diagrammatically illustrated and preferably includes a reversible electric motor 50, a spool 52, a tension detecting device or sensor 54, a tension adjustment device 56 and a manual control device or switch 58. The motor 50 is preferably a dual directional motor that is electrically coupled to the battery of the vehicle 10. The motor 50 has its output shaft operatively coupled to the spool 52 for rotating the spool 52 in both a wind direction and an unwind direction. Thus, the windable member 44 is wound or unwound on the spool 52. Of course, the motor 50 can be replaced with a unidirectional motor that will only retract the windable member 44 onto the spool 52, and that will allow the cable to be manually released for lowering the spare tire unit 12.

The motor 50 is controlled by the tension adjustment device 56 which includes a motor control circuit 60 that drives the motor 50 in both directions. The motor control circuit 60 of the tension adjustment device 56 is operatively coupled to the tension sensor 54 and to a manual control device or switch 58. Thus, the motor control circuit 60 of the tension adjustment device 56 can be either manually operated via control switch 58 or automatically operated via the sensor 54 to drive the motor 50. When the motor control circuit 60 of the tension adjustment device 56 is operated automatically via the tension sensor 54, the motor 50 is driven in the winding direction to retract the windable member 44. Thus, the motor control circuit 60 of the tension adjustment device 56 is configured and arranged with an automatic cable re-tensioning feature that substantially maintains a predetermined tension in the windable member 44. The motor control circuit 60 of the tension adjustment device 56 and the automatic cable re-tensioning feature of the tension adjustment device 56 are known in the automotive field, and thus, will not be discussed or illustrated in detail herein.

The control switch 58 is preferably located in the cabin of the vehicle, and is configured and arranged to operate the motor control circuit 60 of the tension adjustment device 56 to selectively drive the motor 50 in the winding direction to retract the windable member 44 and in the unwinding direction to release the windable member 44.

The tension sensor 54 is configured and arranged to detect whether there is a loss in tension in the retractable windable member 44 from an initial tension amount over some extended period of time. Preferably, the motor control circuit 60 of the tension adjustment device 56 performs this monitoring of the cable tension each time the vehicle 10 is started. When the tension in the windable member 44 decreases below a predetermined amount, the motor control circuit 60 of the tension adjustment device 56 operates the motor 50 to re-tension the windable member 44 to the initial tension amount. As mentioned above, the tire hoist device 24 was initially raised (e.g., automatically shuts off) to the stored position such that the side wall of the rubber tire 12a presses against the lateral cross member 26 and the longitudinal brace 30 to a predetermined initial deflection amount. In the stored position, the initial tension amount of the windable member 44 is used to estimate the initial compression force that is applied to the side wall of the rubber tire 12a to deflect the side wall of the rubber tire 12a inwardly to the predetermined initial deflection amount. Thus, the motor control circuit 60 of the tension adjustment device 56 operates the motor 50 to re-tension the windable member 44 to maintain initial tension amount and thus, maintain the initial compression force that is applied to the side wall of the rubber tire 12a to obtain the predetermined initial deflection amount.

The tension sensor 54 can be any type of device that can directly or indirectly measure the cable tension in the windable member 44. For example, the tension sensor 54 can be a strain sensor that is configured and arranged to detect the torque on the output shaft of the motor 50.

The movable tire support member 46 is releasably coupled to the second end of the windable member 44 such that the spare tire unit 12 can be removed from the tire hoisting device 24. In particular, the movable tire support member 46 is configured and arranged to engage the center opening of the rim 12b of the spare tire unit 12. The particular structure of the movable tire support member 46 is not important to the present invention, and thus, the particular structure of the movable tire support member 46 will not be discussed herein.

The tire pressure detection unit 20 is operatively coupled to the motor control circuit 60 of the tension adjustment device 56 that operates the motor 50. The tire pressure detection unit 20 is configured and arranged to determine if a change in spare tire pressure of the spare tire unit 12 has occurred. The tire pressure detection unit 20 determines if a change in spare tire pressure of the spare tire unit 12 has occurred based on a change in the tension of the windable member 44 as detected by the tension sensor 54. More specifically, the tire pressure detection unit 20 determines that a change in the initial compression force has occurred each time the tension sensor 54 detects that a decrease in the tension of the windable member 44 from the initial tension amount. In other words, the decrease in tire pressure of the spare tire unit 12 is estimated by the tire pressure detection unit 20 based on the decrease in the tension amount of the windable member 44.

As mentioned above, the tire hoisting device 24 will adjust the tension amount of the windable member 44 to maintain the initial tension amount in the windable member 44 when the tension amount falls below a predetermined threshold level. Thus, this re-tensioning of the windable member 44 maintains the initial compression force on the side wall of the rubber tire 12a. Each time the windable member 44 is re-tensioned, the tire pressure detection unit 20 determines the amount that the windable member 44 has been retracted. This retraction amount of the windable member 44 is then correlated to the amount of spare tire pressure of the spare tire unit 12 that has been lost over a period of time. After each re-tensioning operation of the windable member 44 has occurred, the tire pressure detection unit 20 will sum up the retraction amounts of the prior re-tensioning operations to determine if the total amount of cable retraction has exceeded a predetermined amount that correlates to the spare tire pressure of the spare tire unit 12 falling below a predetermined spare tire pressure amount.

As seen in FIG. 8, the tire pressure detection unit 20 preferably includes a pressure detection circuit 70, a tire deflection sensor 72 and a signaling device 74. The pressure detection circuit 70 is operatively coupled to the tire hoisting device 24 for determining a change in spare tire pressure of the spare tire unit 12. The tire deflection sensor 72 is configured and arranged to measure the amount of tire deflection or retraction of the windable member 44. The signaling device 74 is configured to produce a human detectible signal upon determination of the decrease in the spare tire pressure below the predetermined spare tire pressure amount.

The pressure detection circuit 70 is preferably part of a body control unit that includes a microcomputer with a spare tire pressure control program that monitors and calculates the spare tire pressure as discussed below. The pressure detection circuit 70 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the pressure detection circuit 70 can be any combination of hardware and software that will carry out the functions of the present invention.

The signaling device 74 is preferably mounted in the cabin of the vehicle 10, such as on the dashboard. For example, the signaling device 74 can be an audible signal, a visual signal or a combination of an audible signal and a visual signal. The precise construction of the signaling device 74 is not important to the present invention. Thus, the signaling device 74 can be any type of device that produces an audible signal or a visual signal, or both an audible signal and a visual signal.

The pressure detection circuit 70 is configured and arranged to determine the change in spare tire pressure of the spare tire unit 12 based on an amount of retraction of the windable member 44 by the tension adjustment device 56 as mentioned above. In other words, as the tire pressure at the spare tire unit 12 decreases over time, the adjustment device 56 will periodically and incrementally re-tension the windable member 44 to the initial tension amount. Each time the tension adjustment device 56 re-tensions the windable member 44, the tire pressure detection circuit 70 executes a program to determine if the sum of all subsequent re-tensioning of the windable member 44 exceeds a predetermined amount of cable retraction. In particular, the amount of the cable retraction can be directly correlated to the amount of tire pressure loss in the spare tire unit 12. Thus, the tire pressure detection circuit 70 can estimate the current tire pressure in the spare tire unit 12.

Figure 9:
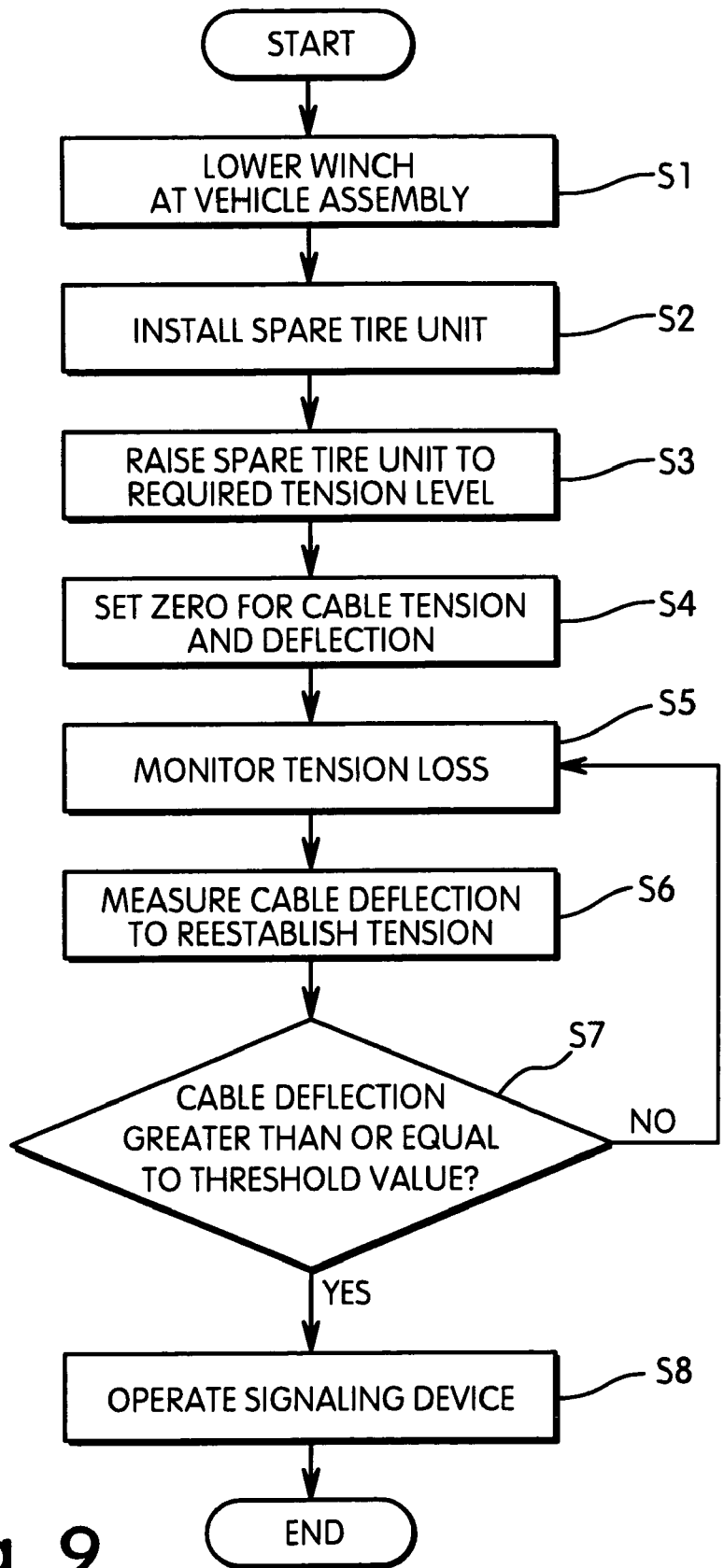
FIG. 9 is a flow chart illustrating the calibration and processing of the vehicle spare tire pressure detection assembly in accordance with the present invention.

Referring now to FIG. 9, the calibration process and tire pressure detecting process of the present invention will now be discussed. Steps S1–S4 are performed at the factory so as to initially calibrate the tire pressure detection unit 20. Steps S5–S8 are performed continuously by the tire pressure detection unit 20 each time the motor 50 is operated by the motor control circuit 60 of the tension adjustment device 56 to re-tension the windable member 44.

In step S1, the motor 50 of the tire hoisting device 24 is lowered. Thus, the movable tire support member 46 can be detached from the windable member 44. Next, in step S2, the spare tire unit 12 is installed on the movable tire member 46 which is reattached to the windable member 44. In step S3, the spare tire unit 12 is raised such that the rubber tire 12a contacts the lateral cross member 26 and the longitudinal brace member 30. The motor 50 is then operated by the tension adjustment device 56 until the required tension level in the windable member 44 is attained. Preferably, the tension sensor 54 is used to determine the tension level in the windable member 44. In step S4, a base level or zero is set for the cable tension in the motor control circuit 60 of the tension adjustment device 56 and a cable retraction position or tire deflection is set and stored. In step S5, the motor control circuit 60 monitors the cable tension via the tension sensor 54. If there is a loss in tension, the motor control circuit 60 of the tension adjustment device 56 operates the motor 50 to retract the windable member 44 to re-tension the windable member 44 to its initial tension amount. The tire deflection sensor 72 measures the amount that the windable member 44 is retracted. In step S6, the tire pressure detection circuit 70 measures the amount of retraction of the cable. In step S7, the tire pressure detection circuit 70 then determines if the amount of retraction has exceeded a predetermined pressure value. If the pressure value has not been exceeded, the tire pressure detection circuit 70 returns to the step S5 where the motor control circuit 60 continues to monitor the tension loss. However, if the retraction of the windable member 44 has exceeded the predetermined pressure value, then the control proceeds to step S8 where the signaling device 74 is operated.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle spare tire pressure detection assembly comprising:
    a stationary tire support structure configured and arranged to be coupled to a vehicle;
    a tire hoisting device configured and arranged to lower a spare tire relative to the stationary tire support structure and raise the spare tire against the stationary tire support structure to apply an initial compression force to deflect a wall of the spare tire, the tire hoisting device including
        a detecting device configured and arranged to detect a change in the initial compression force, and
        an adjustment device configured to raise the spare tire and maintain the initial compression force in response to the change in the initial compression force detected by the detecting device;
    a tire pressure detection unit operatively coupled to the tire hoisting device and configured to determine a change in spare tire pressure of the spare tire based on the change in the initial compression force detected by the detecting device; and
    a signaling device configured to produce a human detectable signal upon a determination of a decrease in the spare tire pressure below a predetermined threshold amount.

2. The vehicle spare tire pressure detection assembly according to claim 1, wherein
    the tire hoisting device is a winch having a motorized winding unit, a retractable windable member with a first end coupled to the winding unit, and a movable tire support member coupled to a second end of the retractable windable member.

3. The vehicle spare tire pressure detection assembly according to claim 2, wherein
    the detecting device is configured to detect the change in the initial compression force of the spare tire based upon a decrease in an initial tension of the windable member that corresponds to the initial compression force applied to the wall of the spare tire; and
    the tire pressure detection unit is configured to determine the change in the spare tire pressure of the spare tire based on an amount of retraction of the windable member by the adjustment device which raises the spare tire to maintain the initial compression force in response to the decrease in the initial tension of the windable member detected by the detecting device.

4. The vehicle spare tire pressure detection assembly according to claim 3, wherein
    the windable member includes at least a cable portion.

5. The vehicle spare tire pressure detection assembly according to claim 3, wherein
    the signaling device is configured to produce a visual signal to an occupant of the vehicle.

6. The vehicle spare tire pressure detection assembly according to claim 3, wherein
    the signaling device is configured to produce an audible signal to an occupant of the vehicle.

7. The vehicle spare tire pressure detection assembly according to claim 1, wherein
    the signaling device is configured to produce a visual signal to an occupant of the vehicle.

8. The vehicle spare tire pressure detection assembly according to claim 1, wherein
    the signaling device is configured to produce an audible signal to an occupant of the vehicle.

9. The vehicle spare tire pressure detection assembly according to claim 1, wherein
    the stationary tire support structure includes a plurality of tire contacting points that are configured and arranged to contact the wall of the spare tire at a plurality of circumferentially spaced apart locations.

10. A vehicle spare tire pressure detection assembly comprising:
- support means for supporting a spare tire to a vehicle;
- tire hoisting means for lowering the spare tire relative to the support means and raising the spare tire against the support means to apply an initial compression force to deflect a wall of the spare tire, the tire hoisting means including
  - detecting means for detecting a change in the initial compression force; and
  - adjusting means for raising the spare tire and maintaining the initial compression force in response to the change in the initial compression force detected by the detecting means;
- tire pressure detection means for determining a change in spare tire pressure of the spare tire based on the change in the initial compression force detected by the detecting means; and
- signaling means for producing a human detectable signal upon a determination of a decrease in the spare tire pressure below a predetermined threshold amount.

11. A spare tire monitoring method comprising:
- raising a spare tire to apply an initial compression force to deflect a wall of the spare tire;
- monitoring changes in the initial compression force on the spare tire;
- further raising the spare tire to substantially maintain the initial compression force on the wall of the spare tire;
- determining a change in the tire pressure of the spare tire based on a change in the initial compression force; and
- producing a human detectable signal upon a determination of a decrease in the spare tire pressure below a predetermined threshold amount.

12. The spare tire monitoring method according to claim 11, wherein
the raising of the spare tire is accomplished by using a winch having a motorized winding unit, a retractable windable member with a first end coupled to the winding unit, and a movable tire support member coupled to a second end of the retractable windable member.

13. The spare tire monitoring method according to claim 12, wherein
the monitoring of changes in the initial compression force on the spare tire is accomplished by detecting a decrease in an initial tension of the windable member that corresponds to the initial compression force applied to the wall of the spare tire; and
the determining of the change in the tire pressure is accomplished by detecting an amount of retraction of the windable member by the motorized winding unit which is used during the further raising of the spare tire to substantially maintain the initial compression force in response to the decrease in the initial tension of the windable member.

14. The spare tire monitoring method according to claim 13, wherein
the producing of the human detectable signal includes producing a visual signal to an occupant of a vehicle.

15. The spare tire monitoring method according to claim 13, wherein
the producing of the human detectable signal includes producing an audible signal to an occupant of a vehicle.

16. The spare tire monitoring method according to claim 11, wherein
the producing of the human detectable signal includes producing a visual signal to an occupant of a vehicle.

17. The spare tire monitoring method according to claim 11, wherein
the producing of the human detectable signal includes producing audible signal to an occupant of a vehicle.

* * * * *